United States Patent [19]

Hickey et al.

[11] Patent Number: 4,526,463

[45] Date of Patent: Jul. 2, 1985

[54] APPARATUS FOR EXPOSING PHOTOSENSITIVE MEDIA

[75] Inventors: Robert V. Hickey; Duane B. Hickey, both of Corvallis; Charles J. Goetzinger, Philomath, all of Oreg.

[73] Assignee: CH2M Hill, Inc., Corvallis, Oreg.

[21] Appl. No.: 403,681

[22] Filed: Jul. 30, 1982

[51] Int. Cl.³ .................. G03B 27/80; G03B 27/20; G03B 27/04

[52] U.S. Cl. .................. 355/83; 355/91; 355/113

[58] Field of Search .............. 355/83, 77, 76, 91, 355/68, 113, 78, 80, 115, 79, 73, 32, 125

[56] References Cited

U.S. PATENT DOCUMENTS

| | | | |
|---|---|---|---|
| 754,083 | 3/1904 | McIntire | 355/113 |
| 1,799,818 | 4/1931 | Hopkins | 355/113 |
| 2,226,157 | 12/1940 | Christie et al. | 355/113 |
| 2,774,289 | 12/1956 | Collins | 355/91 |
| 2,857,555 | 10/1958 | Koen et al. | 355/68 X |
| 3,513,308 | 5/1970 | Tajima et al. | 355/68 X |
| 3,723,000 | 3/1973 | Sowe | 355/83 |
| 3,761,176 | 9/1973 | Lewer | 355/83 |
| 3,860,341 | 1/1975 | Tobias | 355/115 |
| 3,936,186 | 2/1976 | Boland et al. | 355/83 |
| 3,995,955 | 12/1976 | Töpfer | 355/91 |
| 4,029,404 | 6/1977 | Mizukami et al. | 355/76 X |
| 4,053,226 | 10/1977 | Michalski et al. | 355/83 X |
| 4,111,549 | 9/1978 | Cazel et al. | 355/83 X |
| 4,143,968 | 3/1979 | Sader et al. | 355/83 |
| 4,159,176 | 1/1979 | de Masi | 355/125 X |
| 4,161,363 | 7/1979 | Kahle | 355/68 |
| 4,265,532 | 5/1981 | McIntosh | 355/83 X |

FOREIGN PATENT DOCUMENTS 135851 10/1981 Japan ........................ 355/75

Primary Examiner—L. T. Hix
Assistant Examiner—Douglas S. Lee
Attorney, Agent, or Firm—Klarquist, Sparkman, Campbell, Leigh & Whinston

[57] ABSTRACT

An apparatus for exposing photosensitive media is disclosed in which the light reaching the photosensitive layer of the media is monitored, with the exposure being terminated after the desired amount of light has been received. A multiple exposure control is also provided which adjusts the relative exposures during first and second exposures of the photosensitive material. A special roller curtain mechanism is also disclosed. In addition, the apparatus includes a vacuum system for generating a vacuum, as the curtain descends with the vacuum being drawn between the blanket or curtain and a glass plate which supports the sensitized media and originals being copied. The surface supporting the sensitized materials is inclined to facilitate loading and unloading of the apparatus and also the operation of the curtain.

21 Claims, 21 Drawing Figures

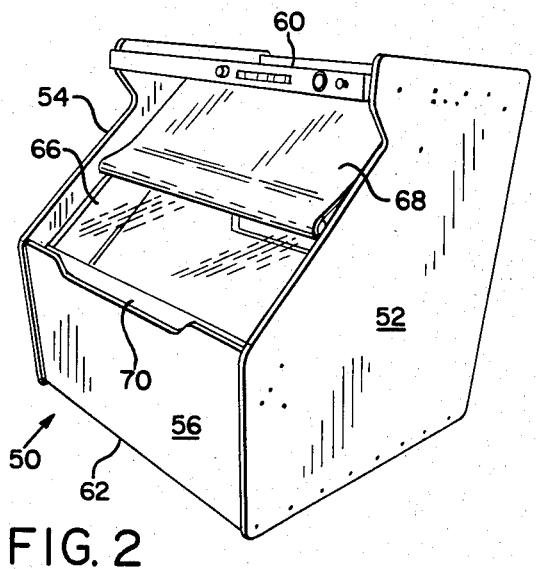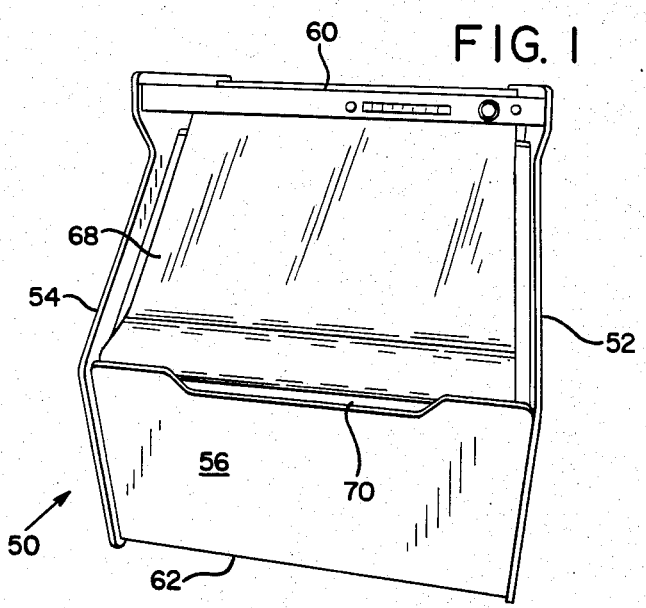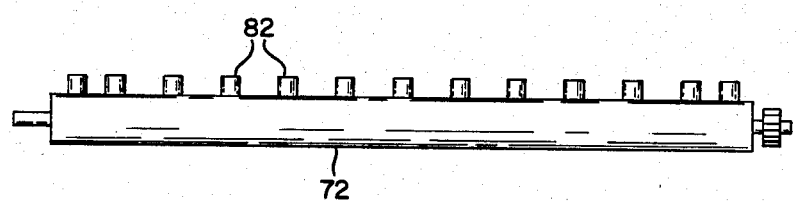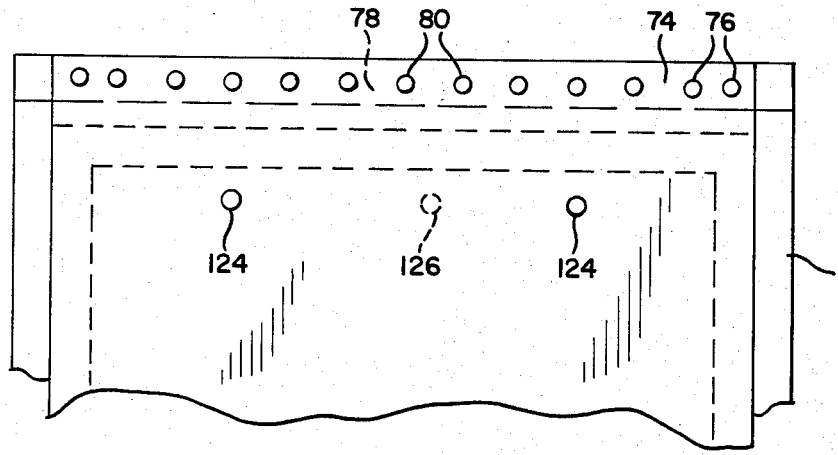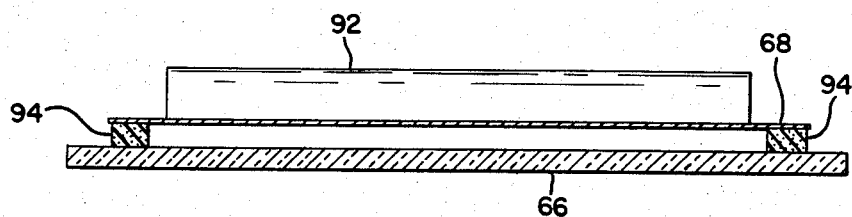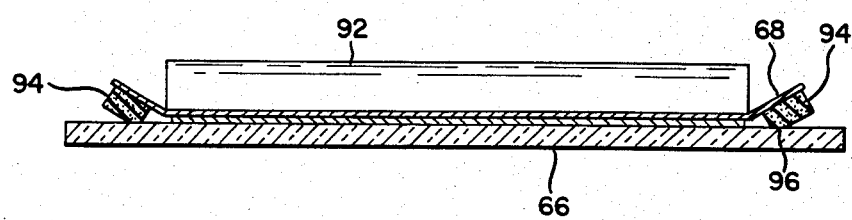

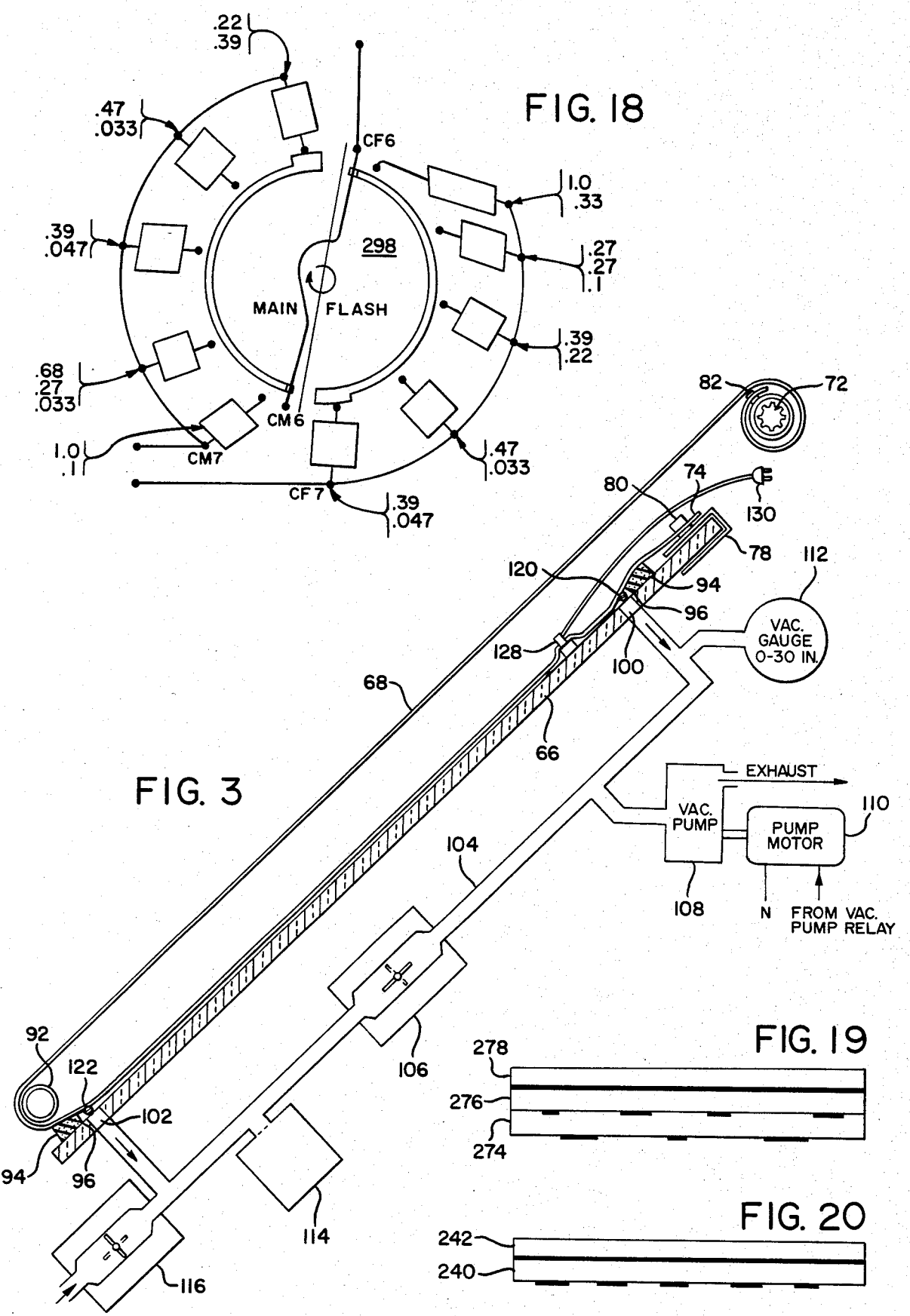

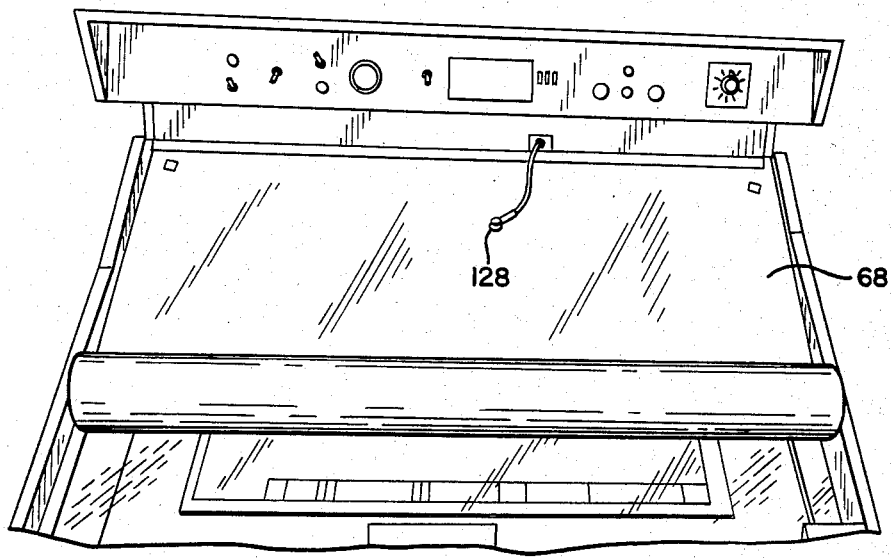
FIG. 8
FIG. 9
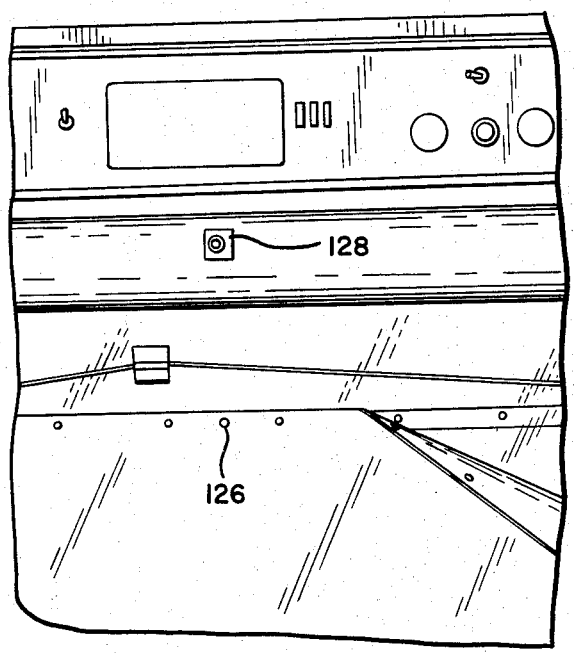

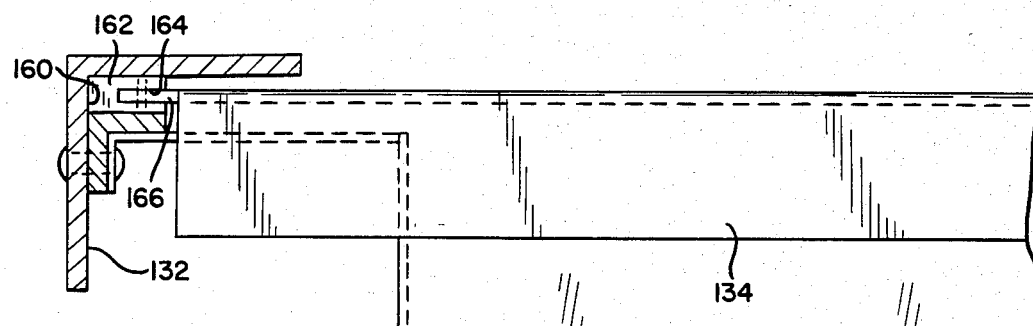
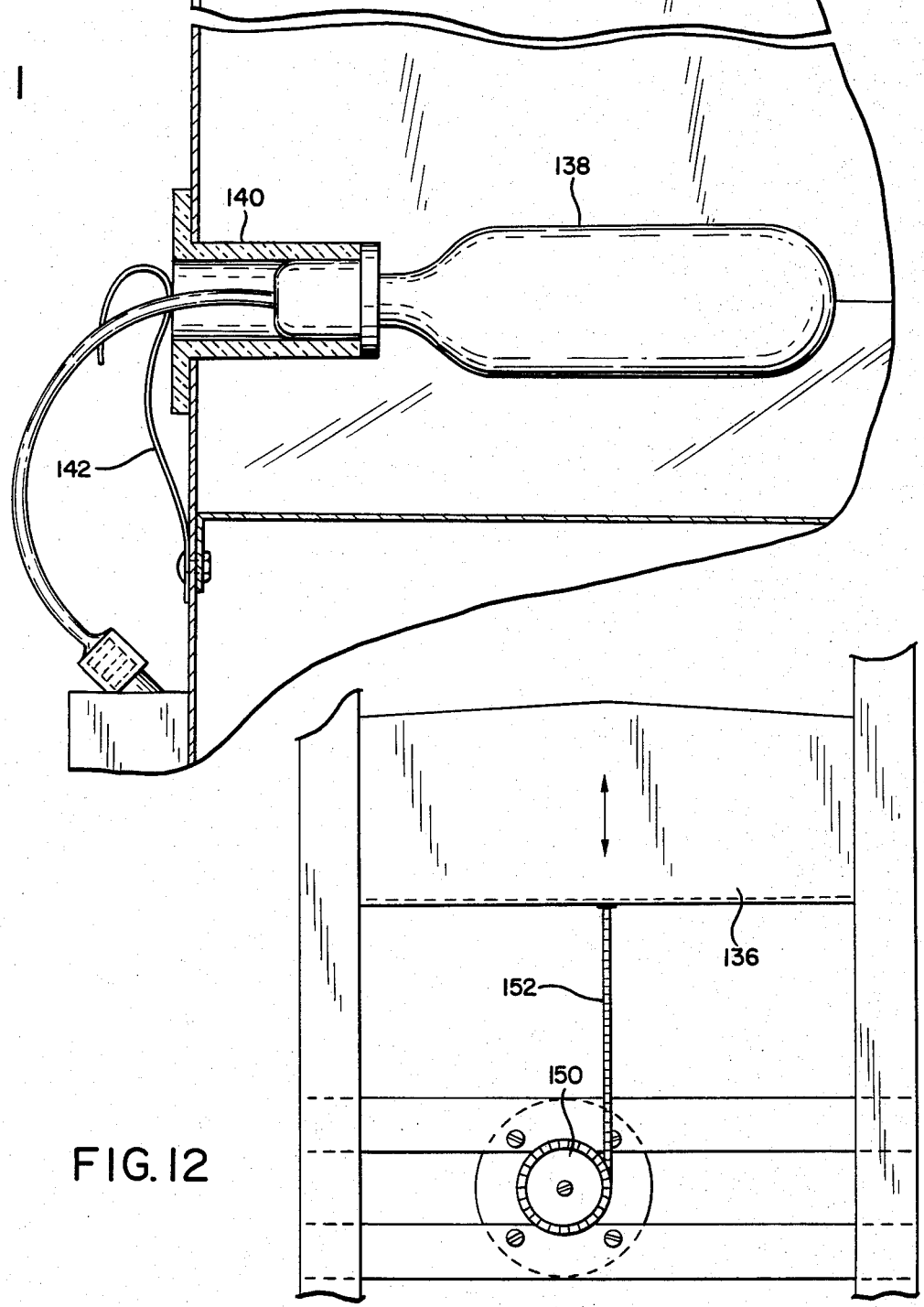
FIG. 11
FIG. 12

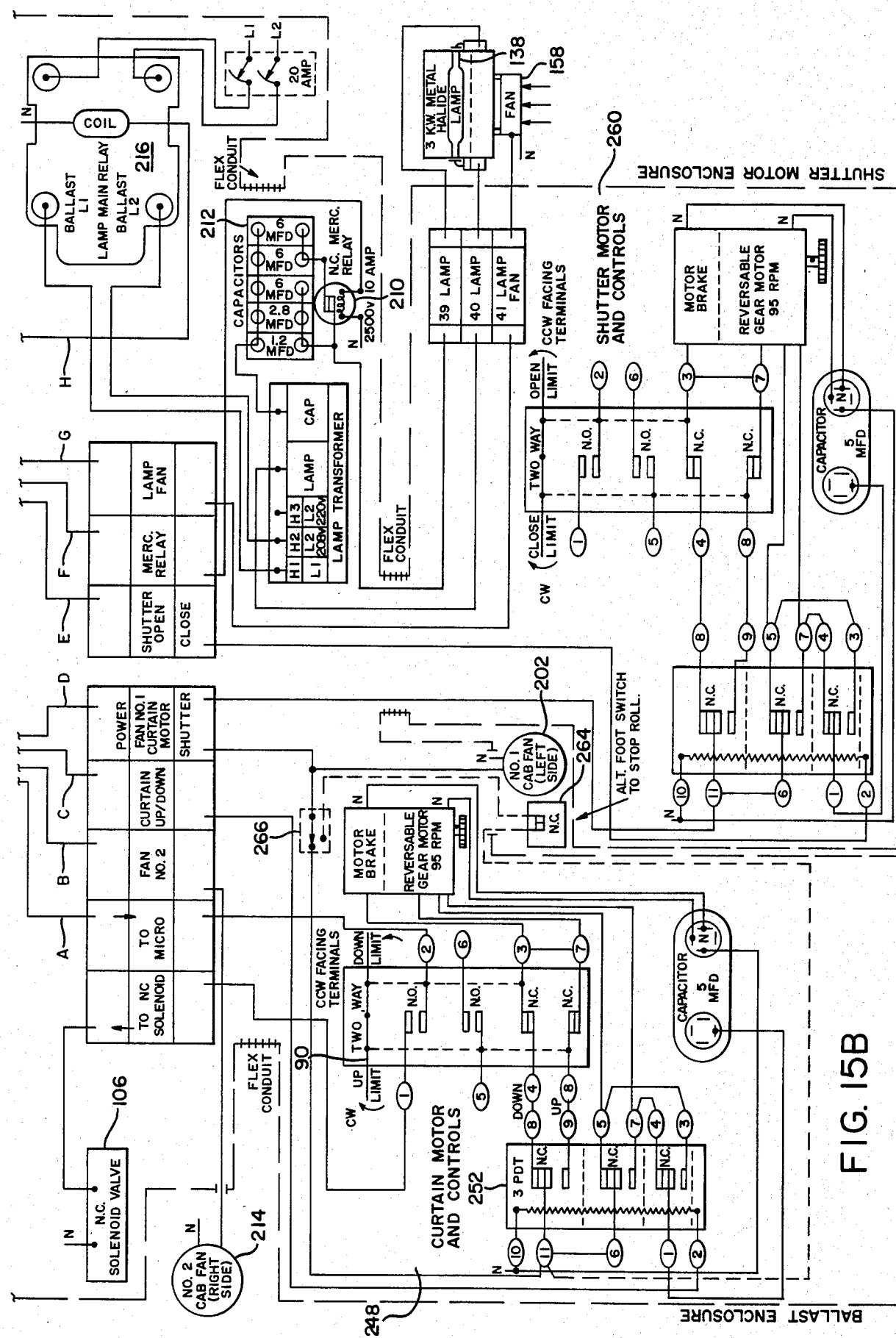

APPARATUS FOR EXPOSING PHOTOSENSITIVE MEDIA

BACKGROUND OF THE INVENTION

This invention relates to an improved apparatus for exposing photosensitive media.

Known print-making devices include a flat glass plate with a light source on one side and a door or curtain on the other side. Means are provided for drawing a vacuum between the door or curtain and the glass plate. This vacuum is drawn after an original film to be copied ("a negative or positive") and an overlying sheet of material containing a photosensitive layer (e.g. diazo) are positioned on the glass plate. The vacuum flattens the sheets against the plate. A light source is turned on for a predetermined period of time, such as determined by a timer, in order to expose the photosensitive layer. The exposed photosensitive sheet is thereafter developed.

In such prior devices, this procedure has required a substantial amount of manual manipulation to properly place the sheets in position for copying. Also, an amount of guess-work as to the proper exposure setting is required, resulting in less than satisfactory reproductions of the originals. In addition, vacuum seals in such devices are not satisfactory. Furthermore, such devices are frequently time-consuming and otherwise difficult to operate.

Therefore, an improved apparatus for exposing photosensitive media is required to overcome these and other problems.

SUMMARY OF THE INVENTION

An improved apparatus for exposing photosensitive media includes one or more of the following features, either alone or in cooperation with one or more of the other features An apparatus for exposing photosensitive media having light sensing means positioned to receive light passing through one or more original sheets (sheets containing material to be copied), but not through a sheet of photosensitive media overlying the originals. The light sensing means thus receives light of an intensity equal to the intensity of the light reaching the sensitized media. The apparatus includes means for monitoring the light received by the sensing means and for automatically shutting off the supply of light upon correct exposure of the photosensitized media Such an apparatus in which the means for monitoring the light comprises an integrator circuit means set by an operator of the apparatus to establish the desired degree of exposure of the sensitized media. The integrator circuit integrates the amount of light sensed over time. When the desired amount of light, that is the correct exposure, has been registered by the integrator circuit, an output signal is produced which automatically shuts off the supply of light to the sensitized media. Because light reaching the photosensitive layer of the sensitized media is monitored, the apparatus compensates for differences in density of the original sheet or sheets, and for variations in the intensity of light from the light source. The intensity of light from the source vary due to power fluctuations, degradations in the light source over time, and the degree to which the light source has warmed up.

Such an apparatus including a rolled flexible curtain or blanket is unrolled in contact with the sheets to press the sheets and hold them in position as the blanket unrolls. The blanket is then rolled up following the exposure.

Such an apparatus in which the blanket is automatically rolled up following the exposure.

Such an apparatus with an optional foot operated control for interrupting automatic movement of the curtain.

Such an apparatus in which the sensor means is attached to the blanket and positioned so as to sense light reaching the underside of the blanket. The sensor being automatically positioned by the blanket, when it is unrolled, to sense light passing through the originals and before the light passes through the sensitized media.

Such an apparatus in which an aperture is provided in the sensitized media, the sensor automatically registering with the aperture in the sensitized media when the curtain unrolls. Thus, the sensor is positioned to receive light which passes through the originals and reaches the photosensitive layer of the sensitized media. The sensor thereby receives light of an intensity which is equal to the intensity of light received at the photosensitive emulsion layer of the sensitized media.

Typically, sensitized media sheets and originals are prepunched with a number of holes. In accordance with a specific feature of the present invention, an additional off-set hole is provided in the sheet of sensitized media. The sensor is mounted on the curtain so that it automatically registers with this additional hole upon unrolling the curtain.

One or more photosensors may be provided, with one such sensor being positioned to monitor one drawing size and others for prints of different sizes. Switches may be utilized to select the appropriate sensor for the particular drawing size.

Such an apparatus in which a vacuum is drawn between the glass plate and blanket during the time the blanket is unrolled. Therefore, the operator does not have to wait for the drawing of the entire vacuum after the blanket covers the sheets.

Such an apparatus in which a looped curtain or blanket is provided with a free-floating tube positioned within the loop for pressing or ironing the sheets as the curtain unrolls over them.

Such an apparatus in which the glass plate is inclined, preferably at an angle approximately equal to 45°. This makes it easier to reach the back of the glass plate, in comparison to a horizontal plate, and thereby facilitates loading and unloading of the apparatus.

Such an apparatus in which the curtain roll is positioned at the upper end of the inclined plate so that gravity aids the unrolling of the curtain. Also so that the curtain smoothes out the sheets as it unrolls to thereby minimize the chance of wrinkling the sheets prior to exposure.

Such an apparatus in which one end of the blanket is releasably connected to the upper edge of the glass plate and the other end of the blanket being releasably connected to a motor-driven shaft mounted adjacent to the upper end of the glass plate. Whereby, as the motor rotates the shaft in one direction, the blanket unrolls in a loop and, as the motor rotates the shaft in the other direction, the blanket is taken up on the shaft. The releasable connections enabling the blanket to pull free of either the shaft or the glass plate, rather than ripping, in the event the motor fails to stop. This also prevents the motor from being stalled by the blanket and burning up.

Such an apparatus in which one end of the blanket is provided with holes through which blanket retaining pegs clipped to the glass plate are loosely received, to thereby releasably connect the one end of the blanket to the glass plate. The other end of the blanket being provided with similar apertures through which blanket retaining pegs on the driven shaft are loosely received, thereby releasably connecting this other end of the blanket to the driven shaft.

Such an apparatus in which the blanket is of a resilient, flexible, durable material, such as a naugahyde type truck seat vinyl, having a textured undersurface which permits the migration of air from the center of the blanket as the vacuum is drawn. The blanket preferably being of a black, non-reflective material to minimize undercutting. That is, to minimize exposure of the photosensitive layers which are covered up by information contained on the originals.

Such an apparatus with a vacuum system having an upper vacuum port and a lower vacuum port. The vacuum initially being drawn by the system from the upper port until the curtain descends sufficiently to overlie the lower port, at which time the vacuum is also pulled through the lower port.

Such an apparatus including transverse air distribution spacers, which may comprise wires extending across the blanket in the region of the ports, for preventing the blanket from sealing the ports as the vacuum is drawn, and also to facilitate drawing of the vacuum under the entire area of the blanket.

Such an apparatus including seal means positioned between the blanket and the glass plate.

Such an apparatus in which the seal means comprises a resilient material secured, as by adhesive, to the underside of the blanket.

Such an apparatus in which the seal means comprises a closed cell neoprene seal, such as of the type utilized to manufacture wetsuits.

Such an apparatus in which the rolling iron or tube is of a length which is less than the distance between the seals along the sides of the blanket. Thus, as the roller or press moves downwardly, the seals are tipped or canted. This compresses the corners of the seals against the glass plate and enhances the resulting seal.

Such an apparatus in which the vacuum is broken slightly before the curtain is raised after exposure. This facilitates the smooth separation of the curtain and sheets as the curtain is raised.

Such an apparatus which, due to the use of a rolling curtain, minimizes any tendency of the curtain to lift the sheets away from the glass as the curtain is rolled up following exposure.

Such an apparatus having a relatively high-speed shutter which minimizes the problem of over-exposing certain regions of the photosensitive media as the shutter is closed.

Such an apparatus in which the light supply is automatically blocked in the event the blanket or cover is inadvertently lifted during exposure, thereby preventing potentially damaging high intensity light from reaching the operator.

Such an apparatus in which the total exposure is monitored so that, if the curtain or cover is inadvertently lifted during exposure, the cover may be repositioned and exposure continued until the desired total exposure is reached.

Such an apparatus including alignment pegs secured directly to the glass plate, such pegs registering with holes in the original and sensitized media sheets, thereby holding a sandwich of these sheets in position In previous devices, some form of metal mounting clamps were typically used. Such devices leave an unsightly shadow on the developed sensitized media. In contrast, pins of the present invention do not leave a shadow and have virtually no effect on the seal between the curtain and the glass plate.

Such an apparatus which is particularly adapted for making prints with lines of different darkness. The apparatus includes means for making a first partial exposure of a sandwich of one or more originals and the sensitized media followed by a second partial exposure with one or more of the originals removed. The portions of the sensitized media initially covered by the removed original or originals but which is uncovered following removal, is faded during this second partial exposure. The faded lines or information constitute background lines on the finished drawing while the information or lines contained in the originals which remained in the sandwich during both exposures are bolder, thereby constituting foreground lines. Control means is provided to automatically adjust the contrast between the background and foreground images on the drawing. This control means allows the operator to shift the ratio of the first and second exposures. This multiple exposure process is also suitable for applications in which solid line reproductions (i.e. diazo) are desired and in combination with screened bases (containing dots, with the boldness of lines determined by the size of the dots).

Such an apparatus in which the relative exposure times are adjusted utilizing a rotary switch coupled to a capacitor bank for selecting the capacity and coupled to an integrator circuit during the first and second exposure times.

It is an object of the apparatus to provide an improved apparatus for exposing photosensitive media.

It is another object of the invention to provide an apparatus which more accurately exposes photosensitive media to provide reproductions of enhanced quality.

A further object of the invention is to provide an apparatus for exposing photosensitive media which automatically compensates for variations in light reaching the photosensitive layer of the photosensitive media.

Another object of the invention is to provide an apparatus for more precisely controlling plural exposures of a photosensitive media.

A still further object of the invention is to provide such an apparatus which is easy to load, unload, and operate.

A further object of the invention is to provide such an apparatus which minimizes the number of manual operations required to expose photosensitive media.

Another object of the invention is to provide such an apparatus which reduces the time required to expose photosensitive media.

These and other objects, features, and advantages of the present invention will become apparent with reference to the following description and drawings

BRIEF DESCRIPTION OF THE DRAWINGS

FIG. 1 is a front perspective view of an apparatus in accordance with the invention, with a curtain shown in the down position;

FIG. 2 is a side perspective view of the apparatus of FIG. 1, with the curtain shown partially down;

FIG. 3 is a side elevational view, partially in section, showing the curtain in the down position and the vacuum system of the apparatus;

FIG. 4 is a side elevational view of the curtain drive shaft;

FIG. 5 is a top plan view of the upper portion of the curtain which is attached to the glass plate;

FIG. 6 is a front elevational view of the curtain of FIG. 3, shown in a rolled up position;

FIG. 7 is a front elevational view of the curtain of FIG. 3, shown in a partially unrolled position, and showing a sandwich of drawings positioned between the curtain and glass plate;

FIG. 8 is a front elevational view of a portion of the apparatus in accordance with the invention with another type of curtain;

FIG. 9 is a partial front elevational view of the rolled up curtain apparatus of FIG. 8 and showing a sensor mounted to the curtain and an aperture in the sensitized paper which automatically registers with the sensor upon unrolling the curtain;

FIG. 11 is an enlarged view of a portion of the shutter apparatus of FIG. 10, showing the mounting of the shutter door;

FIG. 12 is an enlarged view of a portion of the shutter drive;

FIG. 15A and FIG. 15B are electrical schematic diagrams of the relay and power circuit of the apparatus;

FIG. 18 is a schematic diagram of a rotary switch and capacitor bank of the apparatus;

FIG. 19 is an end view of a sandwich of two original sheets and an overlying sheet of photosensitive media; and FIG. 20 is an end view of another sandwich of a single original sheet and one sheet of photosensitive media.

DETAILED DESCRIPTION OF PREFERRED EMBODIMENT

With reference to the figures, an apparatus for directing light through one or more originals to a photosensitized media is shown. The sensitized media can be any type of photosensitive material such as diazo, silver film, or other print paper. The original contains information which is desired to be reproduced on the sensitized media. These originals can be paper, film, cloth, or other material through which light can pass. This apparatus is suitable for dot screen reproductions, as well as solid line reproductions.

Figure 10:
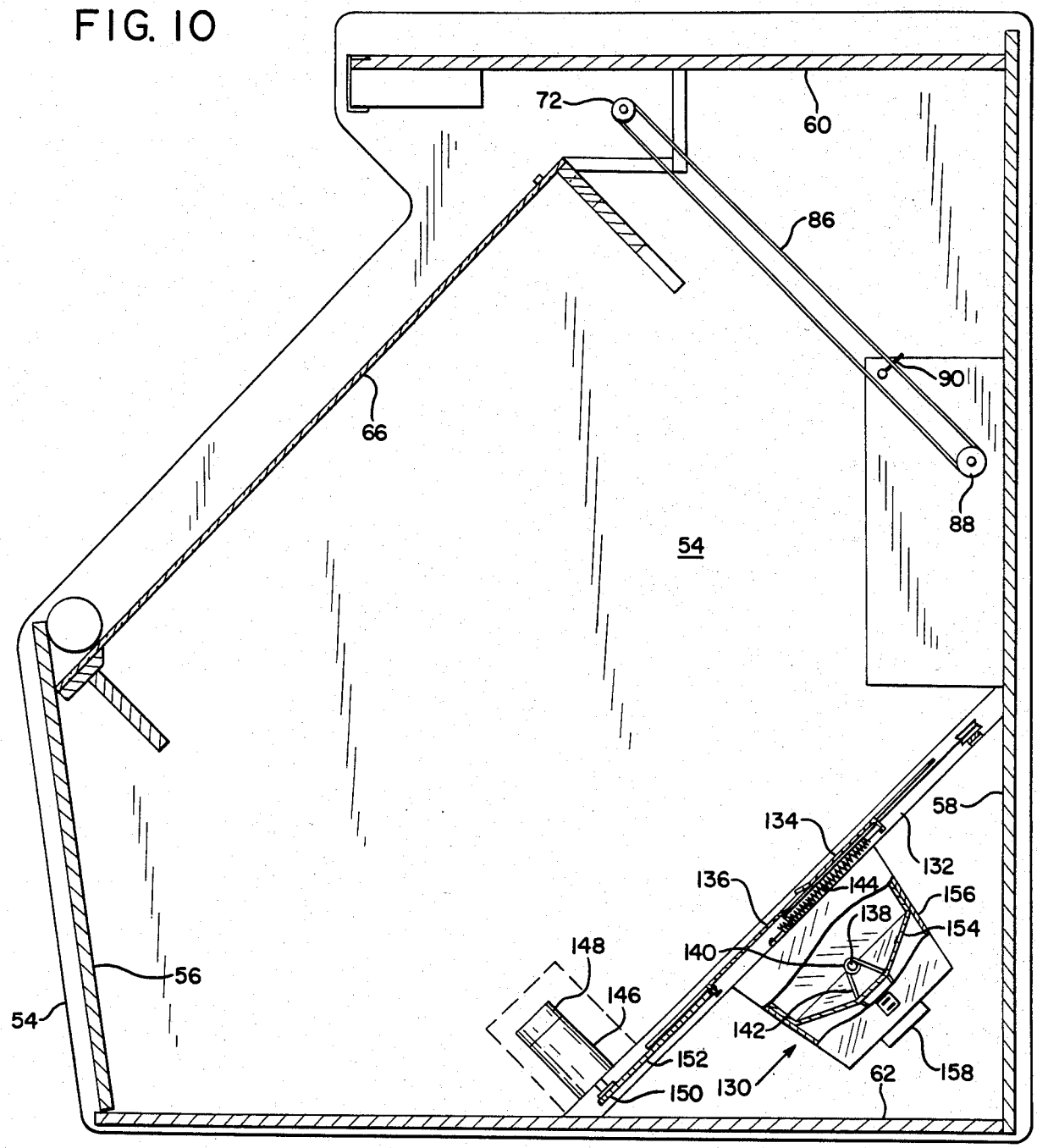
FIG. 10 is a vertical sectional view taken through the apparatus and showing the shutter mechanism of the invention.

With reference to FIG. 1, the apparatus includes an enclosed housing 50 with sidewalls 52, 54, a front wall 56, and a back wall 58 (see FIG. 10). The housing also includes a bottom panel 62 (FIG. 10), and top panel 60.

A plate 66 of a transparent material, preferably glass, is supported by the housing 50. This plate can be positioned in a horizontal plane, a vertical plane, or plane at any angle therebetween. In the preferred embodiment, the plate is inclined as shown in FIGS. 1 and 2. The angle of incline is set at 45° with respect to horizontal. Due to this incline, gravity tends to hold the sandwich of originals and sensitized media sheets against the glass plate. This is an improvement over devices with vertical plates. Also, the upper edge of the sandwich does not tend to heel away from the plate, which is the case as the angle is increased from 45° on up to vertical. In addition, because of the incline, it is easy for the operator to reach the entire surface of the glass plate to position the sandwich on the plate prior to exposure. Also, it is easy to reach the top plate 60, which can then serve as a storage area. This is an improvement over horizontal units in which it is difficult to reach the back of the plate.

Hinged lids or other covers can be utilized to overlie the sandwich after it is positioned on the plate. However, in the illustrated form of the invention, a rolling flexible curtain 68 is utilized. This curtain is explained in detail below in connection with FIGS. 4 through 9. As the curtain is unrolled, either automatically or manually, it presses the sandwiched sheets against the glass plate. The inclined plate aids the descent of the curtain. Also, because the curtain unrolls from the top, and the sandwich of sheets are typically fastened to the glass plate along their upper edges, the descending curtain tends to force air from underneath the sheets and flatten them. A jog plate 70 is provided at the bottom of the apparatus against which the sheets may be bounced to line up their edges.

With reference to FIGS. 3 through 7, one form of rolled curtain will now be described. Curtain 68 is of a flexible, durable material. Also, a vacuum is drawn between the curtain and glass plate to press the sheets flat against the plate. To permit this, the surface of the curtain adjacent to the plate is textured to permit air flow to and from this region as the vacuum is respectively relieved and drawn. A black, non-reflective material is most suitable to prevent undesired undercutting (that is, exposure of the photosensitive material underneath the lines of the original). An exemplary material is a truck seat vinyl of the type sold under the brand name NAUGAHYDE.

In the FIG. 3 form of curtain, a loop is provided. That is, the free end 74 of the curtain is provided with plural apertures 76 spaced transversely along the border of the curtain. A clip 78 is positioned along the upper margin of the glass plate 66. This clip is provided with plural blanket retaining elements such as pins 80 projecting upwardly therefrom. The pins 80 register with the curtain holes 76, thereby loosely and releasably retaining the free end of the blanket to the glass plate. Similar holes are provided along the marginal edge at the opposite end of the curtain. Retaining elements, such as pins 82, projecting from the drive shaft 72 are inserted through these holes in the blanket, thereby loosely retaining the blanket to the drive shaft.

As can be seen in FIG. 10, shaft 72 is driven by a motor 88 via a chain 86. A microswitch 90 contacts stops or triggers (not shown) on the chain to control the operation of motor 88. Assume that, for some reason, the microswitches fail or the motor otherwise does not stop. Because of the loose retention of the curtain to the plate and on the driven shaft, the curtain will pull free from the shaft without tearing. Also, because the curtain falls free, it will not stall the motor, thereby minimizing the risk of a motor burn-out, in the event the motor fails to stop.

Referring again to FIG. 3, a free-floating roller such as tube 92 is positioned within the curtain loop. As the curtain unrolls, the roller travels down the inclined glass plate and presses the sandwich of sheets against the glass plate. In addition, because of the weight of this roller, it aids the curtain in its descent.

The system for sealing the curtain against the glass plate and drawing a vacuum will next be described. A seal is provided between the curtain 68 and glass plate 66. This seal, in the illustrated form, comprises a rectangular gasket 94 mounted to the undersurface of the curtain 68. The gasket is of a durable resilient material, such as closed cell neoprene, and may be adhesively secured to the curtain. An exemplary material is the material utilized in common wetsuits.

The gasket 94 is rectangular in cross section. As the roller 92 passes over the upper horizontal gasket portion, its lowermost corner 96 is compressed against the glass plate to enhance the seal. In addition, as can be seen in FIG. 7, the width of roller 92 is less than the transverse dimension between the gasket portions at the sides of the curtain. Consequently, as the roller 92 travels down the glass plate, the side gasket portions 94 tip. As a result, their lower inner corners 96 are pressed against the glass plate, also enhancing the seal. As can be seen in FIG. 3, the roller 92 travels slightly past the upper edge of the bottom gasket portion. This also compresses corner 96 of the gasket against the glass plate, completing the seal.

As a significant advantage of the present invention, the vacuum system commences to draw a vacuum as the curtain descends. More specifically, the vacuum system is provided with an upper port 100 and a lower port 102. A passageway 104 interconnects these ports and a normally closed solenoid valve 106 is positioned in this passageway. A vacuum pump 108 communicates with passageway 104 between the valve 106 and the upper port 100. A pump motor 110 drives the vacuum pump. A vacuum gauge 112 monitors the pressure at the upper port 100. In addition, a vacuum sensing safety switch 114 senses the pressure in line 104 at a point between port 102 and solenoid valve 106 for purposes explained below. Furthermore, the system includes a normally open solenoid valve 116 communicating with the atmosphere.

In operation, as the curtain starts to descend, pump motor 110 is turned on and vacuum pump 108 commences to draw a vacuum between the curtain and glass plate via port 100. The valve 106 is closed at this time to prevent air from uncovered port 102 reaching the vacuum pump. When the curtain is in the down position, as is sensed by the microswitch 90 (FIG. 10), valve 106 opens so that a vacuum can be drawn at port 102 as well. Also, the valve 116 closes as the curtain descends. Typically, it is desirable to draw a vacuum in the range of 25 to 29 inches at sea level. It has been found that, at the time roller 92 reaches the bottom of its descent, a vacuum on the order of 22 inches at sea level has already been drawn. Thus, very little time is required to complete the drawing of the vacuum after the curtain reaches its down position.

Thus, with this invention, time is saved because the necessary degree of negative pressure is achieved rapidly after the curtain reaches the bottom position. Also, as soon as the pressure reaches the desired negative level, as sensed at switch 114, the control circuit is activated to automatically commence exposure.

Also, switch 114 acts as a safety switch. If an operator inadvertently lifts the curtain 68 during exposure of the sandwich, the rise in pressure is sensed. Switch 114 causes closing of the shutter doors to block the light source. This minimizes the risk of injury to an operator from the high intensity light. Thus, the control circuitry of the apparatus is such that the vacuum sensor controls the supply of light from a light source. Also, as discussed below, a print is not ruined merely because someone inadvertently lifts the curtain. As soon as the cover is lowered and vacuum reestablished, the exposure cycle is restarted at the point it left off and is then carried to completion without ruining the print.

Transverse air distribution means are provided to prevent blockage of the ports 100, 102 by the curtain. These means facilitate the drawing and the relieving of the vacuum between the curtain and glass plate. Such means may comprise transverse wires 120, 122 mounted to the curtain so as to overlay the respective upper and lower ports 100, 102.

After exposure is complete, and a delay of, for example, one second to allow for the shutter to close and the vacuum to bleed through valve 116, the valve 106 closes and the curtain 68 is automatically raised.

As best seen in FIG. 5, a pair of pins are mounted to project upwardly from the upper surface of the glass plate 66. These pins register with holes typically provided in the sheets of the sandwich so that the sandwich can be releasably positioned in the desired position on the glass plate. These pins are short, and therefore do not interfere with the seal between the curtain and the glass plate. In addition, they do not produce an unsightly shadow on the finished print.

In addition, an off-centered aperture 126 is provided through the sheet of sensitized material, but not through the original sheet or sheets. A photosensor, such as a diode 128, is mounted to the curtain (FIG. 3) at a position so that it automatically overlies the aperture 126 when the curtain is lowered. A plug 130 couples the sensor to the control circuit. Therefore, the sensor senses the light passing through the glass plate and data-free portions of the originals, but prior to the passage of the light through the sensitized media. For this reason, the sensor is providing direct monitoring of the light which reaches the photosensitive layer on the undersurface of the sensitized sheet. In applications in which the originals are screens (i.e. originals containing dots), the dots are removed from the portions of the originals beneath the aperture 126. Therefore, the sensor monitors the intensity of light passing through undotted or data-free portions of the original screens to the sensitized paper.

FIGS. 8 and 9 show another form of rolling curtain in which the curtain does not comprise a loop, but is merely unrolled and rolled from a location at the upper end of the glass plate. The rolling and unrolling can be accomplished manually, or by a cable drive system, operable in much the same manner as the drive system described in connection with FIG. 3. FIG. 9 illustrates the position of a sensor 128 and aperture 126.

Any suitable light source and shutter may be utilized. However, preferably, a relatively high speed shutter is employed. Otherwise, prints with uneven exposures result. That is, during closure of the shutter, light continues to reach portions of the sensitized media until the shutter is completely closed. In the preferred embodiment, a shutter apparatus 130 is mounted by a framework 132 between the back panel 58 and floor 62 of the apparatus. The shutter has doors 134, 136 positioned in a 45° plane so that they are parallel to glass plate 66. This results in a more even exposure of the sandwich when upper and lower shutter doors 134, 136 are opened. A lamp, such as a metal halide lamp 138, is positioned behind the shutter doors. The lamp is held in a ceramic retainer 140 which in turn is retained in place by a retaining spring 142. Shutter door closing springs 144 (one being shown in FIG. 10) are provided for closing the doors 134, 136. The doors are opened at desired times by a reversible shutter drive motor 146 coupled by a sprocket 150 and chain 152 to the doors. Motor 146 is provided with a brake 148 to lock the motor and doors in an open position for the desired exposure time in response to the control circuit. A reflector 154 directs light from the lamp toward the sandwich when the doors 134, 136 are opened. A cooling housing 156 surrounds the reflector 154. A lamp cooling fan 158 is turned on by the control circuit at desired times to cool the lamp.

Referring to FIG. 11, a sliding support is provided for the doors and will be described with reference to door 134. More specifically, the framework 132 defines a slot 160 within which a heat resistant bearing material 162, such as sold under the brand name RULON, is positioned. This bearing material is provided with a slot 164 within which a side marginal flange 166 of door 134 is positioned to guide the sliding motion of the door. The other side margin of door 134, and also the margins of door 136, are supported in the same manner.

FIG. 12 illustrates the drive mechanism for the doors in greater detail. As can be seen from this figure, chain 152 is wrapped one complete revolution around the drive sprocket 150 when the door is opened.

Figure 13:
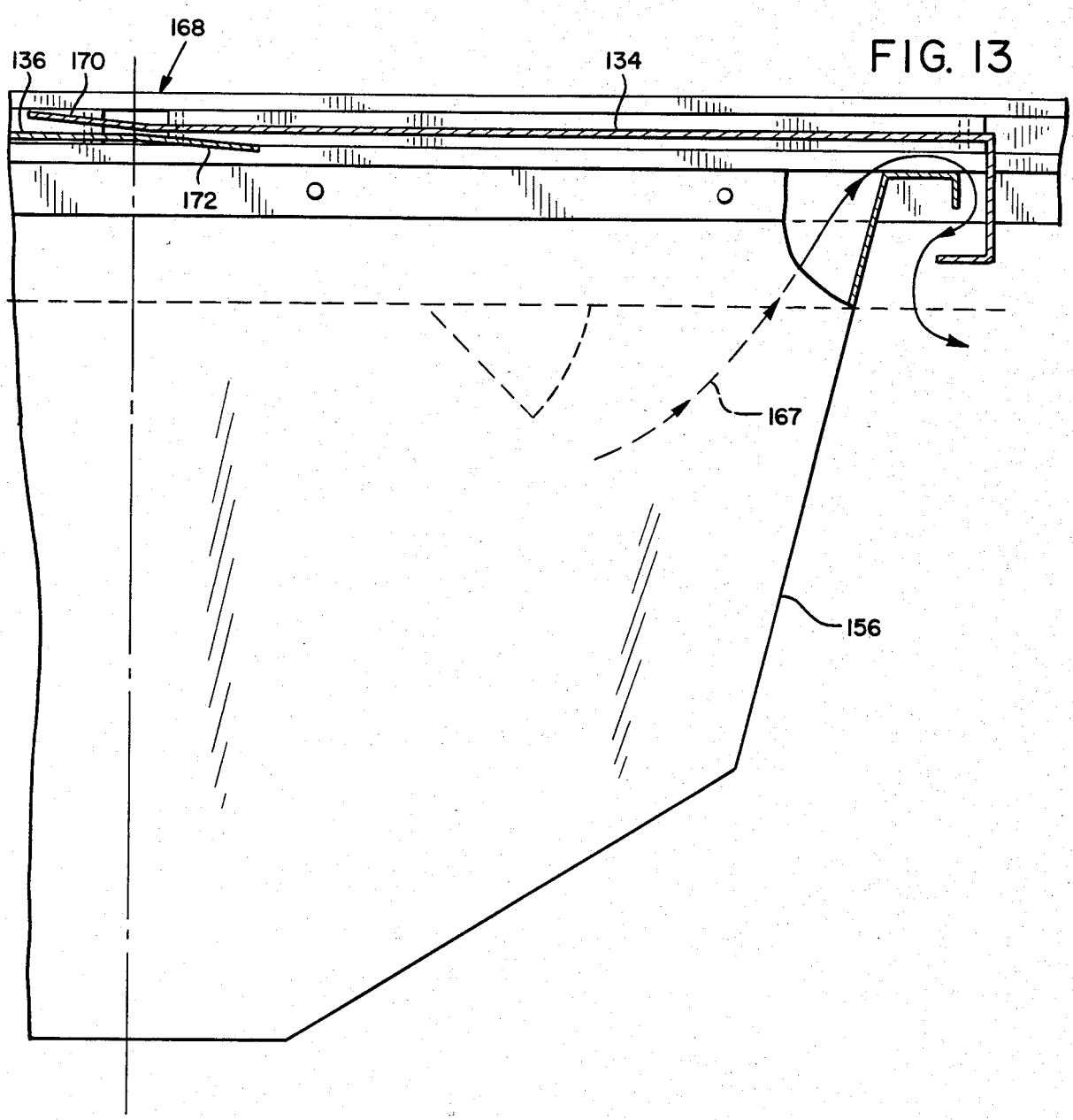
FIG. 13 is an enlarged view of a portion of the shutter housing with the shutter doors shown in a closed position.

As shown in FIG. 13, a convection cooling air gap 167 is provided between the door 134 and reflector housing 166. A similar path is provided between the reflective housing and the blade 136. This cooling air can flow past the doors even when they are closed. The blades overlap one another at 168 to complete the light seal of the shutter when the doors are closed. The free ends 170, 172 of the respective doors 134, 136 are bent away from one another so that the doors are deflected away from one another and do not hang up as they close.

Figure 14:
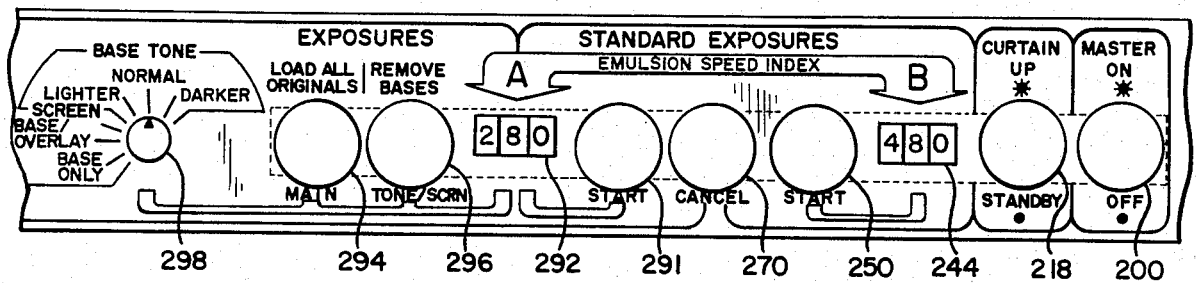
FIG. 14 is a view of the control panel of the apparatus.
Figure 15A:
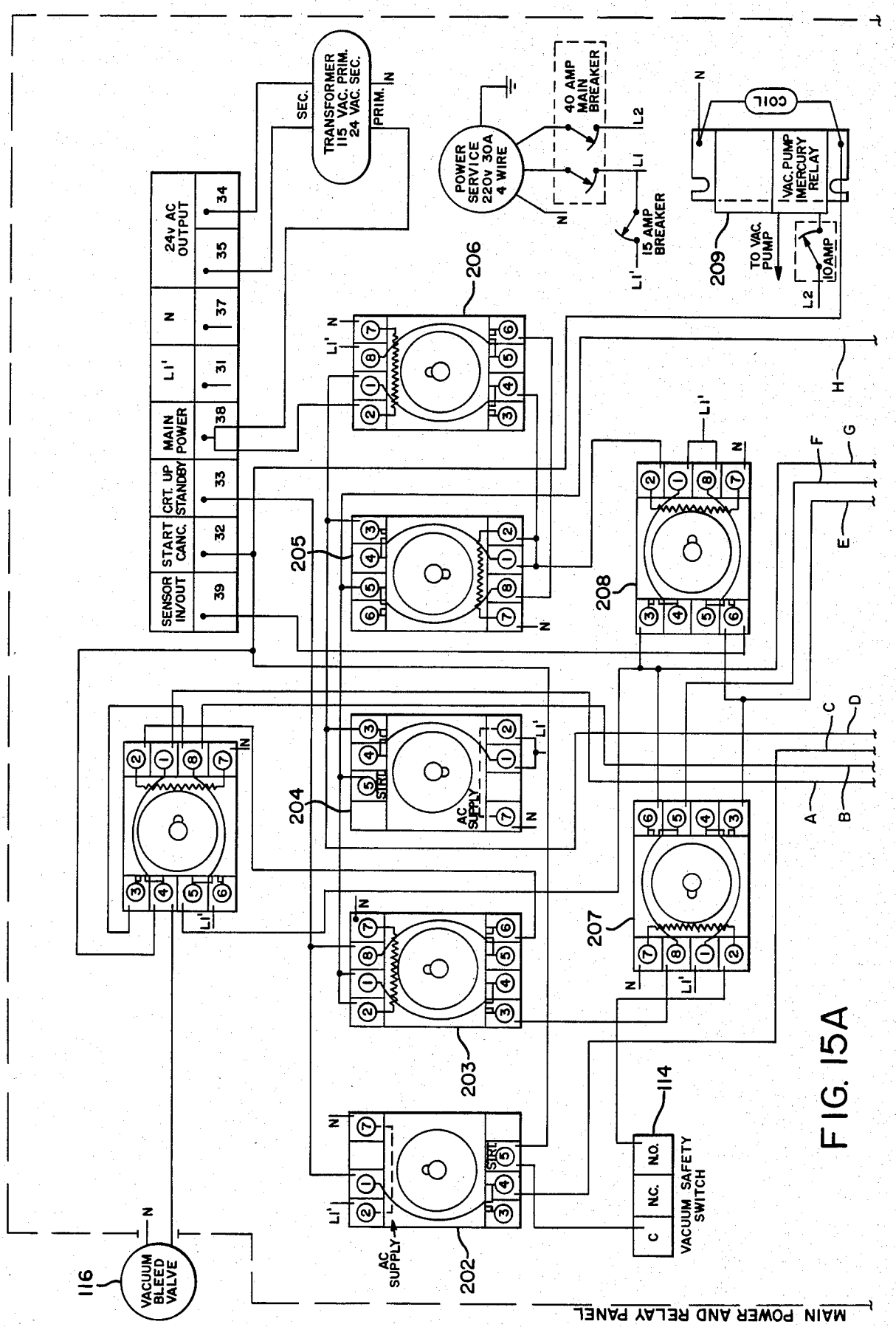
Figure 16:
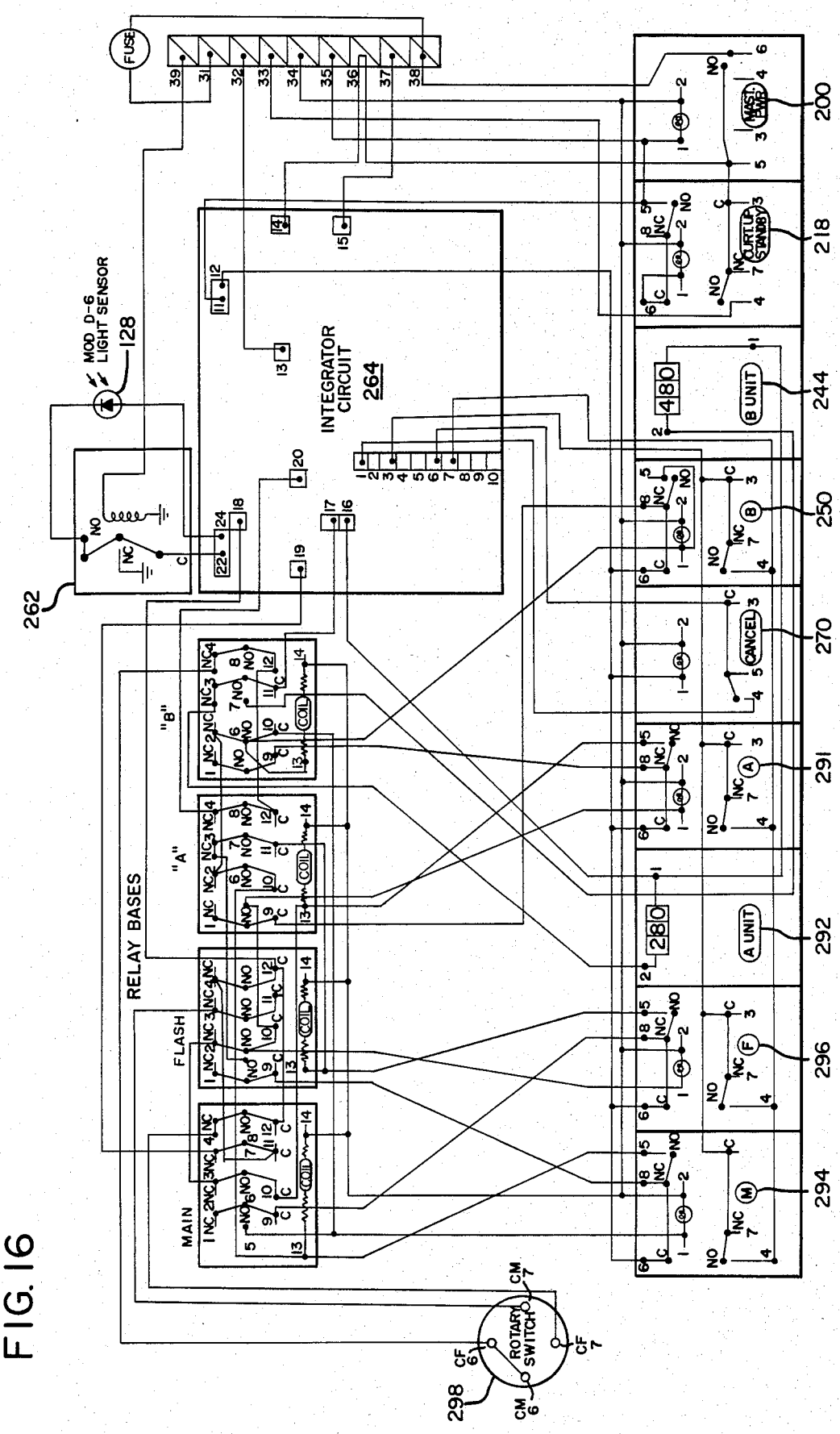
FIG. 16 is an electrical schematic diagram of the control circuit or the apparatus.

The operation of the apparatus will next be described, with reference to the control panel of FIG. 14 and the circuits of FIGS. 15, 16, 17, and 18. The circuits will not be described in detail, as they can be readily understood with reference to a discussion of the operation of the apparatus.

To operate the apparatus, the master switch 200 on the control panel is first turned to the on position. At this time, the first cabinet fan 201 commences operation to cool the inside of the cabinet. Also, the machine start relay 206 is energized so that line voltage passes through this relay and through the normally closed contacts of a relay 205 to a relay 204. Relay 204 comprises a 300-second release delay which controls a cooling cycle after the machine has been shut down. Power also reaches a lamp warm-up relay 203. This relay insures that, for the period of its delay, which in this case is 70 seconds, a mercury switch 210 is maintained closed. When closed, all of the capacitance 212 of the lamp circuit remains in the circuit so that the lamp is maintained at high intensity during this time period.

This enables the lamp to warm up. After this 70-second delay time, and assuming that a print is not being exposed, the switch 210 opens. This drops two capacitors out of the lamp circuit and allows the lamp to switch to a low intensity or idling state. During this 70-second delay, the lamp cooling fan 158 is inoperative. Thus, this fan does not act counterproductively to the warm-up cycle of the lamp. In addition, a second cabinet fan 214 also is inoperable during this 70-second delay.

Power also reaches the lamp coil relay 216 when the master power switch is pushed.

At the end of the 70-second delay, as previously mentioned, the mercury switch 210 opens to cut back on the lamp intensity. This increases the life of the lamp and generates less heat within the apparatus during lamp idling time. However, if a sandwich is being exposed at the end of this delay time, the switch 210 is maintained in a closed position, keeping the lamp 138 at a high intensity.

Also, at the end of the 70-second delay, the cabinet fan 214 turns on if the switch 218 is in the operate (curtain up) position. If the switch 218 is in the stand-by position, meaning the machine is not being used to make a print, then the cabinet fan 214 remains off. The rolling curtain automatically unrolls when switch 218 is in the stand-by position or the master switch 200 is off to cover the machine when it is not in use.

It should be noted that anytime after the master switch is turned on, prints can be made. A warm-up time is not required because the light reaching the sensitized paper is monitored. Therefore, relatively low light intensities during warm-up of a lamp are compensated for by the light sensing and monitoring circuit.

Assume an operator desires to make a print of a single original on a sheet of photosensitive material such as diazo. The sandwich thus could appear as in FIG. 20 with the original 240 placed against the glass plate and the photosensitive sheet 242 placed on top. The B unit 244, a variable resistor and indicator, is set to the desired exposure for the particular emulsion on the photosensitive sheet 242. These exposure levels can be determined for a particular emulsion, with the B unit 244 then being set at a fixed level to obtain a constant exposure each time sensitized media with that type of emulsion is used.

The curtain up button 218 is pushed so that power reaches the curtain motor control circuit 248 via up curtain delay relay 202. If the curtain up button is pushed after an exposure has been started, nothing happens until the exposure is complete. Thereafter, following a one-second delay established by relay 202, the curtain raises. This delay, as previously explained, allows the vacuum valve 116 to bleed the vacuum and also allows time for the shutter doors to close. Because the vacuum bleed 116 is normally open, the vacuum is bled automatically at the end of each exposure. If, at the end of the exposure, the curtain control button 218 is in the stand-by position, then the curtain remains down.

After the curtain is raised, the machine is loaded with the sandwich. Since we are dealing with a sandwich requiring a single exposure, start button 250 is pushed. This results in the energization of vacuum pump relay 209 causing the vacuum pump to draw a vacuum between the curtain and glass plate as the curtain is lowered. Also, the relay 202 is set so that following the exposure, a one-second delay is established prior to the time the curtain raises. That is, the relay 202 is positioned to open the circuit from the curtain up control.

In addition, from the relay 202, the relay 252 is de-energized. As a result, the normally closed contact of this relay opens, resulting in the motor lowering the curtain. When the microswitch 90 is triggered at the curtain bottom position, power is fed to the solenoid valve 106 so that the valve opens and a vacuum is drawn from the bottom port 102 as well as the top port 100 (FIG. 3). After the vacuum safety switch detects a predetermined negative pressure (for example, 25 inches), exposure delay relay 207 is energized. This relay delays the start of the exposure for approximately four seconds to provide additional time for the vacuum pump to complete the establishment of the desired vacuum. Also, if the curtain is raised inadvertently, thereby breaking the vacuum during exposure, switch 114 senses this and immediately causes the shutter to close.

After the delay established by relay 207 is over, the lamp fan 158 is energized, the mercury switch 210 is closed, bringing the lamp up to full intensity, and the shutter is caused to open. The shutter motor control circuit 260 operates in the same manner as the curtain motor control circuit 248 and, therefore, will not be described in detail.

It should also be noted that, while the curtain is being lowered, a signal is sent via terminal 39 to a relay 262 (FIG. 16) which grounds the sensor. This prevents the sensor from picking up static generated from the apparatus as the curtain is lowered. After the exposure delay time established by relay 207 is over, then a signal is sent via relay 208 to the relay 262, recoupling the light sensor 128 to the detection circuit.

Figure 17:
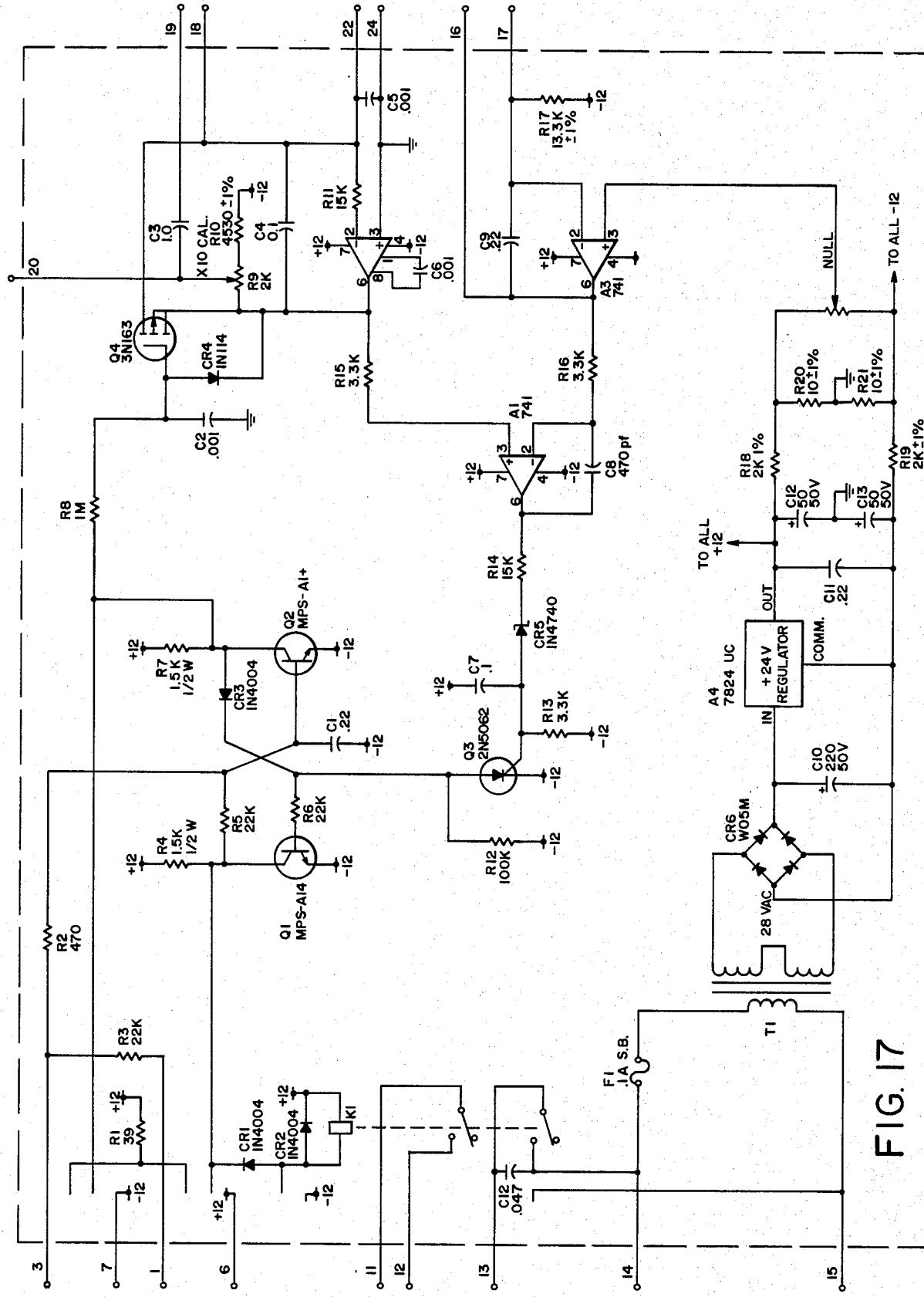
FIG. 17 is an electrical schematic diagram of a suitable integrator circuit for the apparatus.

The sensor picks up the light passing through all but the sensitive layer of the sandwich. This signal is transmitted to a conventional integrator circuit 264 wherein it is monitored. One suitable integrator circuit is designated L-I-46 and manufactured by Chesley-Carlson Company of 2230 Edgewood Avenue, Minneapolis, Minn. 55426. A circuit schematic diagram of this integrator circuit 264 is shown in FIG. 17. This schematic diagram will not be described in detail, as the operation of this circuit is readily apparent to those skilled in the art. The integrator circuit monitors the light received by the sensor until it matches the correct exposure determined by the B time unit 244.

If the curtain is accidentally raised during exposure, the integrator circuit keeps track of the light which was received as of the time the vacuum was broken. When the curtain is reclosed, and after the vacuum is established, exposure continues from where it left off until the desired level of exposure is reached.

After the desired level of exposure has occurred, exposure delay relay 207 is de-energized, the shutter closes, the lamp cooling fan is de-activated, and the mercury switch 210 is opened to drop the intensity of the light to the idling level. In addition, the vacuum pump is stopped and the vacuum bleed valve 116 is opened. Again, the relay 202 delays the opening of the curtain for one second to allow bleeding of the vacuum and closure of the shutters.

The curtain motor then is operated to automatically raise the curtain in preparation for the next print.

An optional foot control switch 264 may be placed in the circuit to permit an operator controlled raising and lowering of the curtain. A switch 266 selectively couples the foot control 264 into the circuit, thereby by-passing the automatic operation of the curtain motor. This feature of a foot control is desired in certain applications. For example, at times it is desired to slowly lower the curtain in short increments, so that an operation can hold the drawing in position as the curtain is lowered. Also, at the end of the exposure, solenoid valve 106 recloses, in preparation for making the next print. Also, a cancel button 270 can be pushed at anytime to end the exposure mid-cycle.

In the event it is desired to completely shut down the machine after use, the curtain control button is pushed to its stand-by position so that the curtain lowers. The master on/off switch is then turned off. This starts the counting down of the 300-second delay established by relay 204. During this time, relay 205 prevents the use of the machine to make additional prints. However, if the machine is loaded during this cooling cycle, master switch 200 turned on, and the exposure start button pushed, then a print will automatically be made following the end of the cooling cycle. In addition, relay 208 causes the lamp fan 258 to operate and cool the lamp. Also, this relay causes the opening of the shutter doors to provide a large flow path for cooling air passing the lamp.

Because of the unique exposure monitoring system, the apparatus of the invention is also particularly well-suited for making drawings having lines of different intensities. Industrial plans, for example, may be made on several overlay films, each showing different information. One sheet may have the basic floor plan of a building, the next showing electrical, the third plumbing, and so forth. Each of these overlays may be laid over the basic floor plan as needed to show the relative location of structural components. If a print of the plumbing layout over the floor plan is desired, one merely places both the original plumbing and original floor plan on the glass plate of the apparatus with the sensitized media being placed over the top.

If, for clarity, one wishes to show a floor plan as a light background and the plumbing features in bold lines, the sandwich of FIG. 19 is assembled with overlays 274, 276, and sensitized media 278. Assuming the floor plan comprises sheet 274, and the plumbing plan comprises sheet 276, then following a partial exposure of the sensitized media 278 to both of the overlays 274 and 276, the floor plan overlay 274 is then removed. An additional partial exposure is made with only the plumbing overlay 276 in position. This leaves the plumbing features in normal, bold line, whereas the background features have been partially burned off by the second exposure.

Making such "toned" drawings, is extremely difficult with existing reproduction equipment. One must guess at the correct total exposure, and how to divide it into two fractional exposures. This is complicated because with each exposure, the sandwich has a different number of film thicknesses, and the various sheets may be of different densities. The metering system of the present invention makes this operation automatic.

More specifically, to make a toned print, the operator loads the complete sandwich of drawings and sensitized media. The emulsion speed index A (292 in FIG. 14) is set to correspond with the desired exposure of the emulsion on the sensitized media being used. Then, the operator presses the "main" button 294 on the control panel. The machine then makes a first partial exposure. The operator removes the overlays containing data which is to be faded into the background, and then presses the tone/screen button 296 to make a second partial exposure. The integrator circuit monitors the actual amount of light being received at the surface of the media during each exposure. It therefore automatically determines when each partial exposure is complete.

The "base tone" control, a switch 298, is used by the operator to decide the amount of contrast between the background and foreground imagery on the print. In other words, this control allows the operator to shift the ratio of exposure levels. This shifting is accomplished by the rotary switch 298 of FIG. 18 which is coupled to the integrator circuit. This switch varies the capacitance coupled to the integrator circuit when the main button is pushed (and hence the first exposure level) to the capacitance coupled to the circuit when the tone/screen or flash button 296 is pushed (and hence the second exposure level). The total exposure is set at a desired level for the particular emulsion. Also, these capacitances can be established at any desired relative level. As an example, in the normal position, the capacitances may be selected so that the first exposure level is equal to the second exposure level. Then, when the switch is moved to the darker position, the first exposure level may be one and one-half times the second exposure level. For a lighter base, the first exposure level may be set at two-thirds of the second exposure level. By selecting the appropriate capacitor values for the desired application, the relative boldness of the background to the foreground information is set. Furthermore, the machine automatically sets these relative values, depending on the position of rotary switch 298, thereby eliminating operator guess-work.

The apparatus also includes a control for multiple exposures of sensitized materials using a tint screen.

In one application a base with a solid unexposed emulsion layer is positioned over, for example, two original sheets. One original containing a building plumbing layout in solid lines, another original containing a building floor plan in solid lines. The switch 298 is set in the base/overlay position, the main button 294 is pushed, and the first exposure is completed. Thereafter, the plumbing layout original, for example, may be removed and a screen having say, 40 percent of its area covered with dots is placed in the sandwich. The second exposure is then accomplished. This burns those portions of the plumbing layout which are not covered with spots, thereby fading out the plumbing layout relative to the floor plan layout.

In another application, a sandwich of an original floor plan overlayed by a sheet of sensitized media is inserted and the first exposure is accomplished with switch 298 in the base only position. The floor plan original is then replaced with a screen and the second exposure is accomplished by pushing switch 296. This results in a screened reproduction of the original floor plan.

Following the exposure of the photosensitive material, it is then developed in a conventional manner for use.

It should be noted that a start button 291 controls the apparatus in the same manner as the B start button, except that the A exposure level control 292 is typically set at a level for another type of emulsion. The A exposure control 292 controls the main and tone/screen controls.

Having illustrated and described the principles of my invention with reference to one preferred embodiment, it should be apparent to those persons skilled in the art that such invention may be modified in arrangement and detail without departing from such principals. For example, the light may be transmitted through one or more pieces or samples of material of equivalent density to the original sheets and then sensed. Also, without limiting the generality of the apparatus, the sensitized media includes any such media used in circuit bound production, printing plate applications, silk screening, and proofing in graphic arts applications. We claim as our invention all such modifications as come within the true spirit and scope of the following claims.

We claim:

1. An apparatus for exposing photosensitive media to a source of light comprising light sensing means for receiving light from the source during exposure of the sensitized media, said light sensing means being positioned to receive light from the source which passes through one or more original sheets or samples thereof, but not through the photosensitive media overlying the originals, so that said light sensing means receives light of an intensity equal to the intensity of the light reaching the sensitized media drying the exposure of the media, said apparatus also including means for monitoring the light received by the sensing means and for automatically stopping the exposure of the photosensitive media upon sensing of a predetermined amount of light.

2. An apparatus according to claim 1 in which the means for monitoring the light received by said sensing means comprises an integrator circuit means, said integrator circuit means being responsive to the amount of light sensed over time by said sensing means for producing an output signal indicative that the predetermined amount of light has been received.

3. An apparatus according to claim 1 including cover means for overlying the sheets, and in which said sensing means is attached to said cover means and positioned so as to sense light reaching the underside of the cover means, said sensing means being automatically positioned by the cover means to sense light passing through the original sheets before the light passes through the sensitized media.

4. An apparatus according to claim 5 in which an aperture is provided in the sensitized media, the sensor means being positioned to automatically register with the aperture when the cover means covers the sheets, thereby positioning the sensor means to receive light passing through the original sheet.

5. A print-making apparatus having an inclined transparent plate for supporting one or more original sheets and a sheet of photosensitive media, cover means for rolling into a position overlying the sheets, said cover means comprising a looped curtain, said apparatus including a floating roller loosely positioned within the loop to act as a press as the curtain unrolls over the sandwich.

6. An apparatus according to claim 5 in which one plate is inclined at an angle approximately equal to 45°.

7. An apparatus according to claim 5 in which one end of the curtain is connected to the upper edge of the plate, said apparatus including a shaft rotatable about a fixed axis, the other end of the curtain being connected to the shaft, whereby as the shaft rotates in one direction, the curtain unrolls in a loop and, as the shaft rotates in the other direction, the curtain is taken up on the shaft.

8. An apparatus according to claim 7 in which the shaft is motor driven.

9. An apparatus according to claim 7 in which one end of the curtain is provided with holes through which curtain retaining pins on the plate are loosely received to thereby releasably connect the one end of the curtain to the plate, the other end of the curtain being provided with holes through which curtain retaining pins on the shaft are loosely received, thereby releasably connecting this other end of the curtain to the driven shaft.

10. A print-making apparatus having a plate for supporting one or more original sheets and a sheet of photosensitive media, cover means for movement between a first position off of the sheets and a second position covering the sheets, said plate including first and second spaced apart vacuum ports, said first vacuum port being positioned in the area of the plate where it will be first covered by said cover means as the cover means moves from the first to the second position, said second vacuum port being positioned in the area where it will be covered second by said cover means as said cover means moves from the first to the second position, said ports communicating with the space between the cover means and plate, means for drawing air from the first port while the cover means is moved across the sheets, means for withdrawing air through the second port after the cover means is moved across the sheets sufficiently to overlie the second port.

11. An apparatus according to claim 10 including transverse air distribution means for preventing the curtain from sealing the ports as the vacuum is drawn.

12. An apparatus according to claim 10 including seal means for sealing the space between the curtain and plate.

13. An apparatus according to claim 12 in which the seal means comprises a resilient material secured to the underside of the curtain.

14. An apparatus according to claim 12 in which the seal means is of a closed cell neoprene material.

15. An apparatus according to claim 12 in which said cover means includes a transverse roller means of a length which is less than the distance between the seals at the sides of the curtain, whereby, as the roller means moves across the sheets with the cover means, the seals are tipped, thereby urging the inner corners of the seals against the plate and enhancing the seal.

16. An apparatus according to claim 10 in which the vacuum is automatically broken slightly before the curtain is raised.

17. An apparatus including means for making a first partial exposure of a sandwich of one or more original sheets and a sensitized media sheet followed by a second partial exposure with one or more of the original sheets removed, said apparatus including sensing means for receiving light passing through the original sheets and not through the sensitized media sheet, means for monitoring the sensed light and terminating the first and second exposures at predetermined exposure levels.

18. An apparatus according to claim 17 including relative exposure means for adjusting the ratio of the first and second exposure.

19. An apparatus according to claim 18 in which said control means includes rotary switch means for varying capacitance connected to integrator circuit means during the first and second exposures to vary said exposures.

20. A method of exposing photosensitive media to a source of light comprising:
 exposing a sandwich of one or more original sheets and a sheet of photosensitive media to a source of light;
 sensing the light passing through the originals but not through the photosensitive media as the sandwich is exposed;
 monitoring the light received by the sensing means; and
 stopping the exposure upon sensing a predetermined amount of light.

21. A method according to claim 20 including the step of providing an aperture in the sheet of photosensitive media and in which the step of sensing the light comprises the step of sensing the light passing through the originals and the aperture.

* * * * *

UNITED STATES PATENT AND TRADEMARK OFFICE
CERTIFICATE OF CORRECTION

PATENT NO. : 4,526,463

DATED : July 2, 1985

INVENTOR(S) : Robert V. Hickey, Duane B. Hickey, and Charles J. Goetzinger

It is certified that error appears in the above-identified patent and that said Letters Patent is hereby corrected as shown below:

Column 14, line 39: "Claim 5" should be --claim 3--.

Column 16, line 40: Print claims 22, 23 and 24, which were missing from the printed patent, as follows:

22. A method according to claim 21 including the step of positioning a light sensor on a cover so as to automatically register with the aperture upon closing the cover over the sandwich.

23. A method of making a first partial exposure of a sandwich of one or more original sheets and a photosensitive media sheet followed by a second partial exposure with one or more of the original sheets removed comprising:

first exposing a sandwich of one or more original sheets and a photosensitive media sheet to a source of light;

monitoring the light to which the sandwich is exposed during the first exposure;

UNITED STATES PATENT AND TRADEMARK OFFICE
CERTIFICATE OF CORRECTION

PATENT NO. : 4,526,463

DATED : July 2, 1985

INVENTOR(S) : Robert V. Hickey, Duane B. Hickey, and Charles J. Goetzinger

It is certified that error appears in the above-identified patent and that said Letters Patent is hereby corrected as shown below:

stopping the first exposure when the sandwich has been exposed to a first predetermined amount of light;
      removing one or more of the original sheets to leave a modified sandwich;
      second exposing the modified sandwich to the source of light;
      monitoring the light to which the modified sandwich is exposed during this second exposure; and
      stopping the second exposure when the modified sandwich has been exposed to a second predetermined amount of light.

24. A method according to claim 23 including the step of adjusting the first and second predetermined amounts of light to adjust the ratio of the first and second exposures.

Signed and Sealed this

Twenty-sixth Day of November 1985

[SEAL]

Attest:

DONALD J. QUIGG

Attesting Officer     Commissioner of Patents and Trademarks